United States Patent [19]

Fericean et al.

[11] Patent Number: 5,504,425

[45] Date of Patent: Apr. 2, 1996

[54] INDUCTIVE SENSOR RESPONSIVE TO THE DISTANCE TO A CONDUCTIVE OR MAGNETIZABLE OBJECT

[75] Inventors: Sorin Fericean, Leonberg; Michael Friedrich, Wolfschlugen; Ernst Gass, Stuttgart, all of Germany

[73] Assignee: Gebhard Balluff Fabrik feinmechanischer Erzeugnisse GmbH & Co., Neuhausen, Germany

[21] Appl. No.: 248,056

[22] Filed: May 24, 1994

[30] Foreign Application Priority Data

May 25, 1993 [DE] Germany ............... 43 17 359.4

[51] Int. Cl.$^6$ .................. G01V 3/11; G01B 7/14; H03B 5/08
[52] U.S. Cl. .................. 324/207.16; 324/207.26; 324/236; 324/327; 331/65
[58] Field of Search .................. 324/207.16, 207.26, 324/236, 237, 327; 307/116, 117; 331/65; 340/941; 361/180

[56] References Cited

U.S. PATENT DOCUMENTS

| | | | |
|---|---|---|---|
| 4,001,718 | 1/1977 | Wilson et al. | 324/236 X |
| 4,609,882 | 9/1986 | Gehring et al. | 324/207.26 X |
| 4,613,830 | 9/1986 | Kamiya et al. | 324/207.26 X |
| 4,644,298 | 2/1987 | Kamiya et al. | 324/236 X |
| 4,803,444 | 2/1989 | Takahashi | 324/236 X |
| 4,968,953 | 11/1990 | Kanda et al. | 324/207.16 X |

FOREIGN PATENT DOCUMENTS

| | | |
|---|---|---|
| 2910491 | 9/1979 | Germany . |
| 4232426 | 4/1993 | Germany . |

Primary Examiner—Gerard R. Strecker
Attorney, Agent, or Firm—Barry R. Lipsitz

[57] ABSTRACT

In order to improve a sensor for detecting an electrically conductive or magnetizable object with an oscillator comprising a resonant circuit including an inductance and a capacitance, the resonant circuit impedance depending on a damping distance between the inductance and the object and rising steeply in the range of small damping distances, further rising less steeply in the range of medium damping distances and substantially having a constant value in the range of large damping distances, and a closed adaptive loop stage supplying a loop current for the resonant circuit and generating a course of an amplitude value dependent on the damping distance, and an evaluation circuit detecting an oscillator voltage applied to the resonant circuit, such that the oscillator also oscillates in the range of small damping distances and has a characteristic curve, with which the oscillator voltage varies with the damping distance also in the range of small damping distances, it is suggested that the course of the amplitude value of the loop current in the range of small damping distances has at least one oscillation-maintaining segment, the gradient of which is smaller than the gradient of the course of the amplitude value in the range of medium damping distances.

26 Claims, 9 Drawing Sheets

5,504,425

INDUCTIVE SENSOR RESPONSIVE TO THE DISTANCE TO A CONDUCTIVE OR MAGNETIZABLE OBJECT

BACKGROUND OF THE INVENTION

The invention relates to a sensor for detecting an electrically conductive or magnetizable object with an oscillator comprising a resonant circuit including an inductance and a capacitance, the resonant circuit impedance depending on a damping distance between the inductance and the object and rising steeply in the range of small damping distances, further rising less steeply in the range of medium damping distances and substantially having a constant value in the range of large damping distances, and a closed adaptive loop stage supplying a loop current for the resonant circuit, this loop stage generating a course of an amplitude value dependent on the damping distance, and an evaluation circuit which detects an oscillator voltage applied to the resonant circuit.

Sensors of this type are known, for example, from European patent application 0 371 489.

In these sensors the response behavior depends on how the oscillator voltage applied to the resonant circuit is altered in response to the damping of the resonant circuit, i.e. in response to the damping distance of the object from the inductance. The course of the oscillator voltage over the damping distance is designated as characteristic curve of the oscillator, whereby only that part of the characteristic curve in which the oscillator voltage alters in response to the damping distance can be used for sensor tasks.

The European patent application 0 371 489 already describes a circuit, in which the part of the characteristic curve, in which the oscillator voltage alters with the damping distance, is extended, whereby in this circuit an extension of the characteristic curve takes place towards large damping distances and a behavior of the characteristic curve unfavorable for small damping distances, in particular any "breakdown" of the oscillator at small damping distances, is accepted.

Proceeding on the basis of the European patent application 0 371 489, the object underlying the invention is to improve a sensor of the generic type such that the oscillator also oscillates in the range of small damping distances and exhibits a characteristic curve, with which the oscillator voltage varies with the damping distance also in the range of small damping distances.

SUMMARY OF THE INVENTION

This object is accomplished in accordance with the invention, in a sensor of the type described at the outset, in that the course of the amplitude value of the loop current in the range of small damping distances has at least one oscillation-maintaining segment, the gradient of which is smaller than the gradient of the course of the amplitude value at medium damping distance.

The inventive solution therefore provides the possibility of keeping the oscillator oscillating even at small damping distances, at least in a partial range, by altering the course of the amplitude value of the loop current at small damping distances and, therefore, of maintaining an oscillator voltage which varies with the damping distance in this partial range even at small damping distances.

Therefore, the inventive sensor can be preferably constructed, in addition, with the features according to German patent application P 43 06 950.9.

Moreover, the inventive solution offers the additional advantage that with such a sensor the oscillator has a shorter starting time in contrast to an oscillator known from the state of the art and, therefore, the switching frequency of the inventive sensor, in particular in the case of strong damping, is also higher.

In a particularly advantageous embodiment, the course of the amplitude value of the loop current has a plurality of oscillation-maintaining segments in the range of small damping distances, i.e. the course of the amplitude value in the range of small damping distances has a plurality of segments with different gradients, whereby the gradient of each of these segments is smaller than the gradient of the course of the amplitude value in the range of medium damping distances.

With such a course of the amplitude value, the oscillator may be kept oscillating as far as very small damping distances.

In a particularly advantageous solution, successive oscillation-maintaining segments have an increasingly large gradient with increasing damping distance, i.e. in the reverse case the oscillation-maintaining segments have the smallest gradient at very small damping distances. This is especially important when the oscillator is intended to oscillate as far as very small and smallest damping distances and exhibit a course for the oscillator voltage which differs from zero and varies with the damping distance.

A particularly advantageous course of the oscillator voltage over the damping distance results when the course of the amplitude value of the loop current is continuous which precludes any sudden alterations in the loop current and, on the other hand, any sudden alterations in the oscillator voltage so that the entire part of the course of the oscillator voltage which is variable with the damping distance can be used for a reliable detection of a plurality of damping distances, for example during use of the inventive sensor as a proximity switch or inductive path or distance indicator.

It is particularly advantageous for the use of the inventive sensor as a proximity switch or inductive path indicator for the gradient of the course of the amplitude value of the loop current to be continuous in the range of small damping distances so that the gradient varies steadily but not irregularly. This also leads to a course of the oscillator voltage over the damping distance which is as uniform as possible.

In this respect, it is even more advantageous for the gradient of the course of the amplitude value of the loop current to be continuous, i.e. for the gradient to vary only steadily and not erratically over the entire course of the amplitude value of the loop current, which again results in a continuous course of the oscillator voltage over the damping distance.

Since a course of the oscillator voltage over the damping distance which is as linear as possible is required for the utilization of the inventive sensor as a proximity switch or inductive path indicator, it is particularly advantageous for the course of the amplitude value of the loop current to also be essentially linear in the range of medium damping distances. This results, in particular, in an essentially linear course of the oscillator voltage at these damping distances.

With respect to the course of the amplitude value of the loop current within the range of small damping distances, it is particularly advantageous for this to have the largest gradient at the transition from the range of small damping distances to the range of medium damping distances, whereby this gradient advantageously corresponds approximately to the gradient of the course of the amplitude value in the range of medium damping distances so that the gradient of the course of the amplitude value alters within the range of small damping distances.

Moreover, an appropriate functioning of the inventive sensor is obtained when the course of the amplitude value of the loop current has the segment with the smallest gradient in the range of small damping distances near to the damping distance zero so that in this range the oscillations of the resonant circuit are assisted to as great an extent as possible by the course of the amplitude value of the loop current.

With respect to the gradient of the segments no details have so far been given. In general, a gradient of the oscillation-maintaining segment of the course of the amplitude value which is intended to be smaller than the gradient of the course of the amplitude value in the range of medium damping distances is to be understood as every gradient value which is smaller than the value serving as reference, whereby the gradient can also be negative.

It is particularly expedient for one of the oscillation-maintaining segments to have a gradient $\leq$ zero.

In conjunction with the previous comments on individual embodiments of the inventive solution no further details have been given with respect to the absolute values of the course of the amplitude value of the loop current. The reduction of the gradient of the loop current in comparison with the gradient at medium damping distances already results in the course of the amplitude value not being reduced linearly, as in the range of medium damping distances, when the damping distance is reduced but to a lesser extent which already leads to an extension of the oscillator function to the range of small damping distances. This does not, however, automatically ensure that the course of the amplitude value of the oscillator voltage has values greater than zero over the small damping distances corresponding to the entire oscillation-maintaining segment.

This is fulfilled only when the course of the amplitude value of the loop current has values in the range of the oscillation-maintaining segment which prevent any "breakdown" of the oscillator.

One embodiment is particularly advantageous, in which the course of the amplitude value of the loop current has values in the range of small damping distances which prevent any breakdown the oscillator as far as damping distances of near to zero.

In particular for the use of the inventive sensor as a proximity switch or inductive path indicator it has proven especially advantageous for the course of the amplitude value of the loop current to lead to a course of the amplitude value of the oscillator voltage rising essentially continuously in the range of small and medium damping distances.

It is, however, even better for the course of the amplitude value of the loop current to lead to a course of the amplitude value of the oscillator voltage rising essentially linearly in the range of small and medium damping distances.

In conjunction with the comments on the preceding embodiments no details have been given as to how the range of small damping distances is to be defined. In an advantageous solution, the resonant circuit impedance behaves according to the formula $R=R_{res0}(1-e^{-B}/K)$, where Rres0 is the resonant circuit impedance without damping, B the distance between object and inductance and K a functional constant, and the range of small damping distances is at values of B<2K.

Based on such a behavior of the resonant circuit impedance, the range of medium damping distances may also be advantageously defined and this is defined such that at medium damping distances B has values of between approximately 2K and approximately 4K.

In a further embodiment of the inventive sensor, the resonant circuit impedance behaves according to the formula $R=R_{res0}(1-e^{-B}/K)$, where Rres0 is the resonant circuit impedance without damping, B the distance between object and inductance and K a functional constant, and the oscillation-maintaining segment is at values of B< approximately 1.5K.

An even better oscillation behavior of the oscillator in the inventive sensor is obtained when the oscillation-maintaining segment is at values of B$\leq$ approximately 1K; it is particularly advantageous when the oscillation-maintaining segment is at values of B$\leq$ approximately 0.5K.

In conjunction with the description of preceding embodiments, no details have been given as to how the adaptive loop stage is to be designed in detail.

For example, it would be conceivable in one embodiment of the inventive solution to measure the resonant circuit impedance at the respective damping distance and to select and set the corresponding amplitude value of the loop current from a family of characteristics in response to the respective resonant circuit impedance. With this solution, any optional course of the amplitude value of the loop current could be set.

A simplified solution which is, above all, inexpensive to produce provides for the loop stage to comprise a feedback stage supplying a feedback current and an additional current stage supplying an additional current.

In this respect, it is, in particular, conceivable to design the feedback stage of the loop stage in accordance with a known oscillator circuit and to achieve the desired course of the amplitude value of the loop current by designing the additional current stage accordingly.

In an advantageous embodiment of the inventive solution, at resonant circuit impedance values or damping distances corresponding to the oscillation-maintaining segment the additional current stage supplies a greater additional current to the feedback current than outside the range of small damping distances.

In one advantageous embodiment, in particular, the resonant circuit impedance behaves according to the formula $R=R_{res0}(1-e^{-B}/K)$, where Rres0 is the resonant circuit impedance in the undamped state, B the distance between object and inductance and K a functional constant, and at values of the resonant circuit impedance which correspond to a distance B of less than 1.5K the additional current stage feeds a greater additional current into the resonant circuit than at a distance B>2K.

It is even more advantageous for this to take place at values of the resonant circuit impedance which correspond to a distance B of less than 1K and it is even better for the increased additional current to be supplied already at a distance B of less than 0.5K.

A particularly advantageous embodiment provides for the additional current stage, at values of the resonant circuit impedance which correspond to a distance B of less than 3K, to supply an additional current altering the loop current appreciably to higher values in comparison with the feedback current.

Within the scope of the embodiments described so far, according to which the loop current stage comprises a feedback stage and an additional current stage, no details have been given to the effect that in the case, in which the loop current is only equal to the feedback current, the oscillator no longer oscillates at a critical damping distance and therefore breaks down.

In this case, it is particularly advantageous for the additional current stage to supply a greater additional current at damping distances essentially in the range of the critical damping distance than above this distance so that as a result of this additional current the critical damping distance can be shifted towards smaller damping distance values.

It is particularly advantageous for the additional current stage to supply a greater additional current at damping distances below the critical damping distance than above it.

In the two preceding cases, it is preferable for the additional current to have values which lead to this preventing any breakdown of the oscillator in conjunction with the feedback current.

In a particularly advantageous embodiment, the course of the additional current falls with increasing damping distance.

An embodiment has proven to be particularly advantageous, in which the course of the additional current falls similar to the reciprocal value of the damping distance.

With respect to the additional current stage supplying the additional current, no details have again been given in the above. In a particularly advantageous embodiment, for example, the additional current stage has a constant current source and a voltage-adapting current control.

This voltage-adapting current control can be designed in the most varied of ways. It must merely be designed such that the additional current increases with a falling oscillator voltage in the range of small damping distances.

In an advantageous embodiment, for example, the voltage-adapting current control has a difference amplifier.

In this respect, the voltage-adapting current control is preferably operated such that it gets a control voltage corresponding to a control voltage for the feedback stage.

No details have so far been given with respect to the design of the feedback stage. In an advantageous embodiment, for example, the feedback stage comprises a positive feedback stage and an amplifier for controlling the same.

An advantageous embodiment of the feedback stage comprises a feedback stage operating as an oscillator-amplitude dependent, current feedback stage.

In this respect, the positive feedback stage is preferably designed as a current mirror which is controlled by the amplifier and, in particular, the amplifier is designed such that it comprises a single transistor connected as amplifier.

BRIEF DESCRIPTION OF THE DRAWINGS

Additional features and advantages of the invention are the subject matter of the following description as well as the drawings of several embodiments. In the drawings:

FIG. 7a to 7c together form a Schematic explanation of the function of the additional current stage according to FIG. 6 in the dedamped state (dotted curves) and in the damped state (dash-dot curves), wherein FIG. 7a shows the curve of the oscillator voltage ULC over the time, FIG. 7b shows the curve of the voltages U1 and U2 in FIG. 6 over the time, FIG. 7c shows the curve of the voltage UE in FIG. 6 over the time.

DETAILED DESCRIPTION OF THE INVENTION

Figure 1:
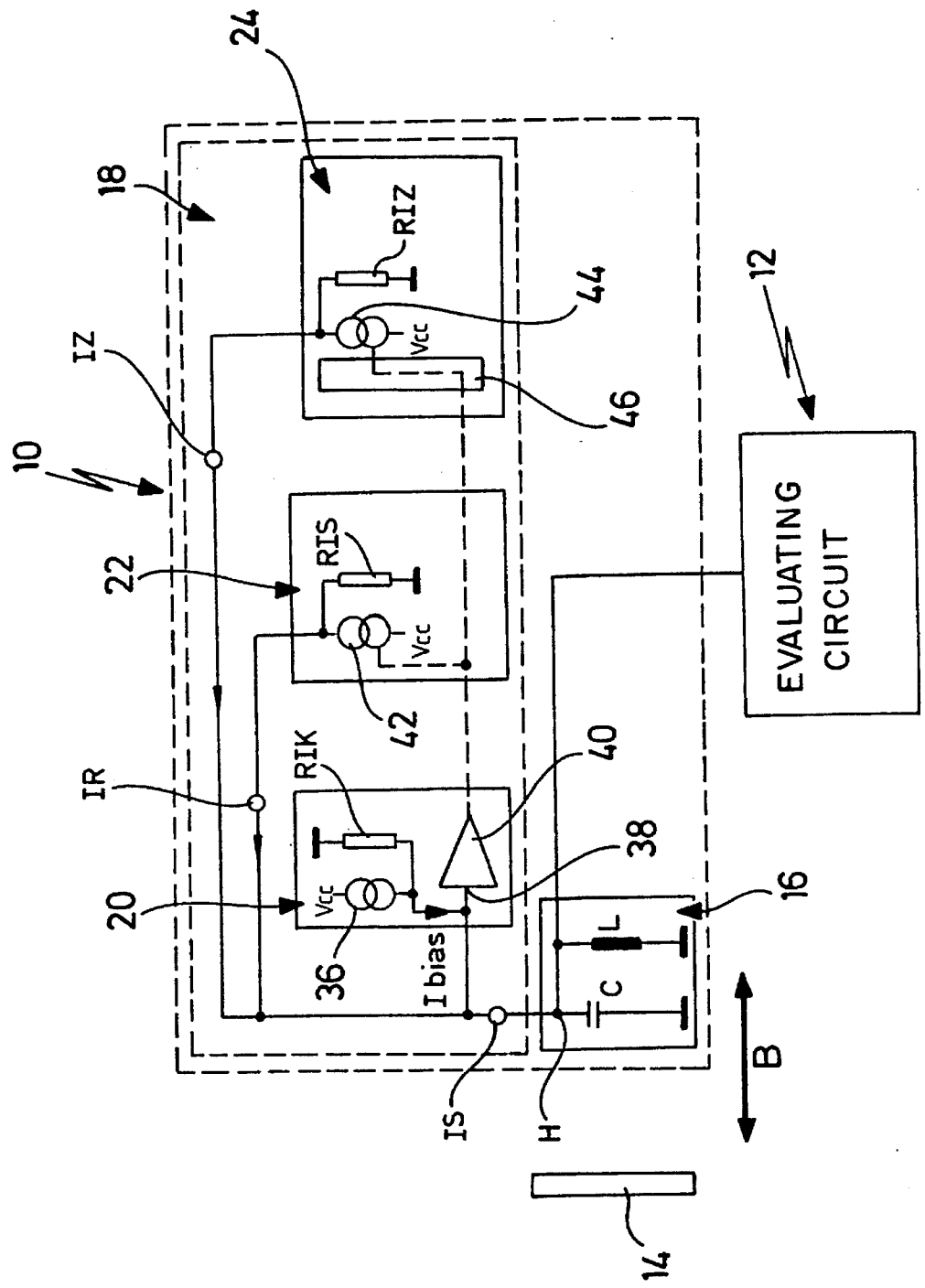
FIG. 1 is a block diagram of a first embodiment of an inventive sensor.

One embodiment of an inventive sensor illustrated in FIG. 1 comprises an oscillator designated as a whole as 10 and an evaluating circuit designated as a whole as 12, which detects an oscillating state of the oscillator 10.

This oscillating state of the oscillator 10 can be influenced by an object 14 to be detected, namely according to a damping distance B of the object 14 from an inductance L of a resonant circuit 16 of the oscillator 10.

The resonant circuit 16 comprises for its part a capacitance C and the inductance L which are connected in parallel and, on the one hand, are connected to earth whereas, on the other hand, a loop current IS, which maintains a resonant oscillation state and is generated by an adaptive loop stage 18, is fed into the circuit at a connection H. An alternating current impedance of this resonant circuit oscillating at a resonant frequency varies on the basis of a damping of the inductance L by the object 14, whereby this is made of a material which is either electrically conductive or magnetizable.

The adaptive loop stage 18 comprises a control stage 20 which is preferably designed as an amplifier stage and a positive feedback stage 22 which is controlled by the control stage 20 and generates a feedback current IR.

In addition, the adaptive loop stage 18 comprises an additional current stage 24 which generates an additional current IZ as further positive-feedback current, whereby the additional current IZ and the feedback current IR are added together to form the loop current IS.

In detail, the control stage 20 comprises an amplifier 40 picking up at an input 38 a voltage ULC applied to the connection H. For its part, the amplifier controls with an output a current source 42 of the positive feedback stage 22, whereby the current source 42 supplies the feedback current IR.

In the case of a bias voltage required by the amplifier 40, the control stage 20 comprises a constant current source 36 which feeds a constant direct current Ibias into the resonant circuit 16 at the connection H of the resonant circuit provided for the loop current IS, in addition to the loop current IS in the resonant circuit 16.

For its part, the additional current stage 24 likewise comprises an additional current source 44 which supplies the additional current IZ in a controlled manner, taking the voltage ULC into account, whereby the additional current IZ supplied by the additional current source 44 is controlled by a control stage 46, to which an input voltage corresponding to the voltage ULC is applied.

Additionally, it also has to be taken into account in the adaptive loop stage 18 that the constant current source 36, which is present if required, has an internal resistor RIK, the current source 42 an internal resistor RIS and the additional current source 44 an internal resistor RIZ which influence the behavior of the oscillator 10.

Figure 2:
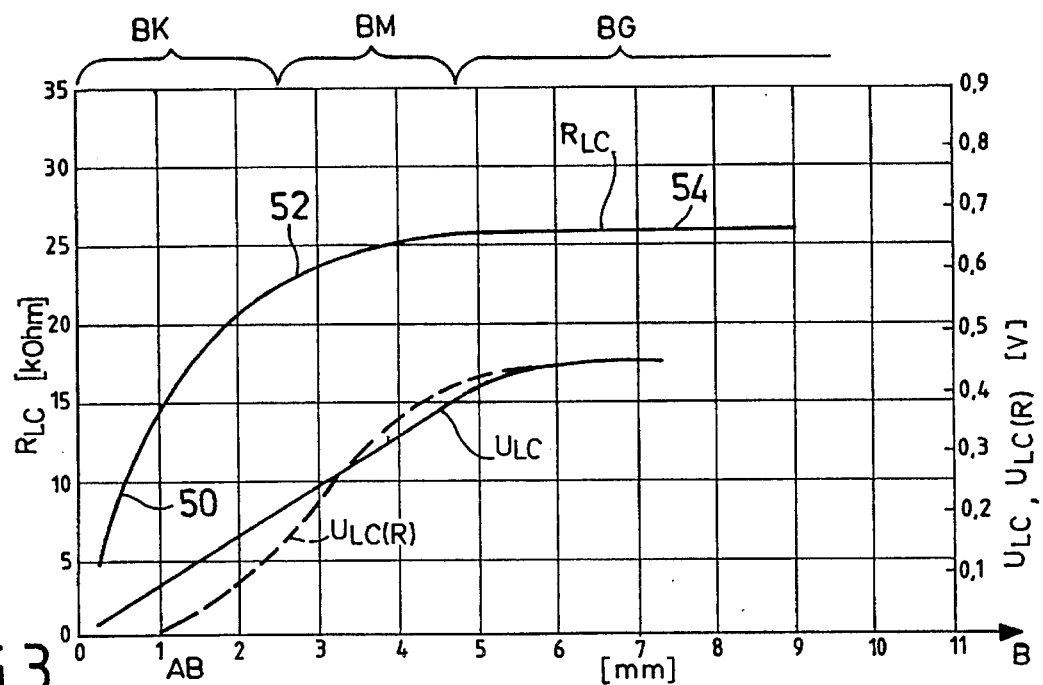
FIG. 2 is an illustration of the curve of a resonant circuit impedance RLC of an inventive sensor, a characteristic curve ULC of an inventive sensor and a characteristic curve ULC (R) of a sensor known from the state of the art.

The total impedance RLC of the resonant circuit 16 at resonant frequency, taking into account the internal resistors RIK, RIS and RIZ, is illustrated in FIG. 2 over the damping distance B of the object 14 from the resonant circuit 16. This total impedance RLC rises steeply in one section 50, preferably with a gradient which becomes increasingly smaller. This section 50 corresponds to a range BK of small damping distances B. Thereafter, the total impedance rises further in a section 52. This corresponds to a range BM of medium damping distances B.

In a range BG of large damping distances B, the total impedance has an essentially constant value in a section 54.

Figure 3:
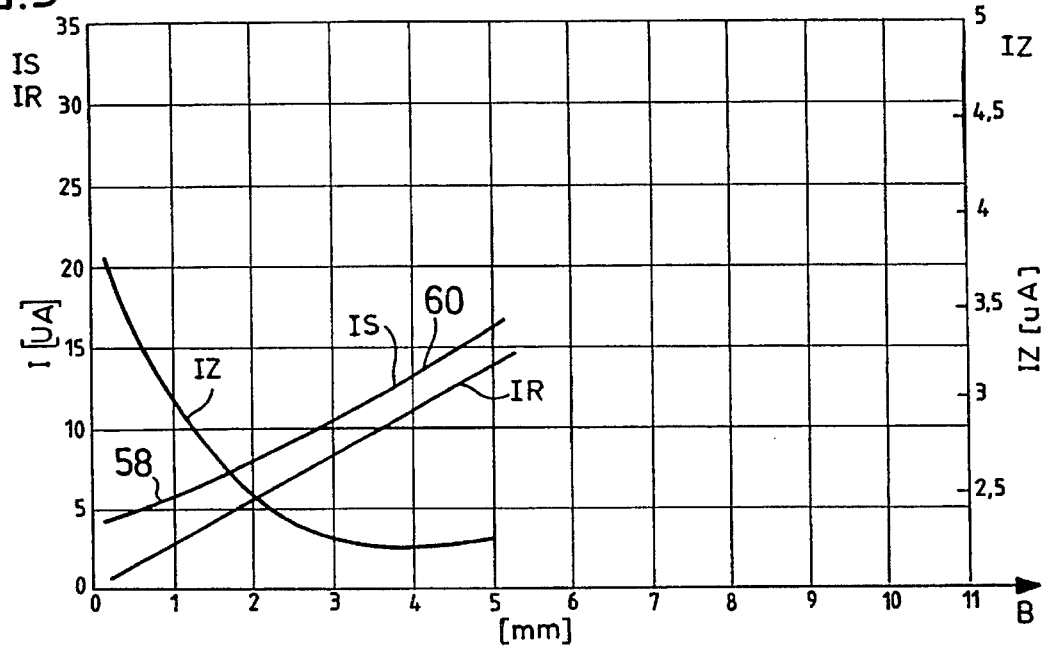
FIG. 3 shows a course of the amplitude value of a loop current IS of an inventive sensor and the two partial currents, the feedback current IR and the additional current IZ, resulting in the loop current IS in the embodiment of FIG. 1.

The resonant circuit impedance RLC behaves, in particular, according to the formula $R=R_{res0}(1-e^{-B}/K)$, where $R_{res0}$ is the resonant circuit impedance without damping, B the damping distance and K a functional constant. The range BK of small damping distances B is between B>0 and B<2K, the range BM of medium damping distances B is between B>2K and B<4K and the range BG of large damping distances is B>4K. With such a course of the impedance RLC of the resonant circuit 16, the characteristic curve of the oscillator 10, i.e. the course of the amplitude value of the voltage ULC over the damping distance B, increases preferably linearly over the damping distance B when the course of the amplitude value of the loop current IS, as illustrated in FIG. 3, consists of two parts, namely the feedback current IR, which is, preferably, approximately linear over the damping distance due to the mode of operation of the amplifier 40 and the current source 42, and the additional current IZ, which, as illustrated in FIG. 3, supplies appreciable additional amounts to the current IR in the range BK of small damping distances which corresponds approximately the steeply falling section 50 of the impedance RLC. In this section, the current IZ supplies additional parts to the current IR which behave approximately the same as a 1/B course with increasing damping distance B.

The influence of the additional current IZ, supplied by the additional current stage 24, can be explained on the basis of FIG. 2 when the voltage ULC (R) which is obtained at an additional current IZ=0 is drawn in, i.e. in a case in which the course of the amplitude value of the loop current IS merely corresponds to the feedback current IR. In this case, the oscillator 10 no longer oscillates below a damping distance AB. This point of breakdown is therefore designated as breakdown point AB so that ULC is already 0 at this breakdown point before the damping distance B itself becomes 0.

In addition, the course of ULC (R) is considerably steeper than that of ULC and is approximately S-shaped so that an oscillator operating without additional current IZ does not display the inventive advantages.

Furthermore, it is apparent from FIGS. 2 and 3 that the additional feedback current IZ keeps the oscillator 10 oscillating until close to the damping distance B=0, and, on the other hand, the oscillator 10 quickly starts to oscillate as a result.

In the illustration of FIG. 3, it is to be taken into account that an extended abscissa scale (right side) has been used for IZ. The addition of the currents IR and IZ therefore results in the loop current IS which, at least in the range of small and medium damping distances, corresponds to a course of the voltage ULC over increasing damping distance which rises essentially linearly.

The course of the amplitude value of the loop current IS is, for its part, essentially linear in the range BM of medium damping distances; in the range BK of small damping distances the gradient of the course of the amplitude value of the loop current IS is smaller in a segment 58 than in a section 60 which corresponds to the range BM of medium damping distances.

The gradient in the range BK of small damping distances preferably decreases more and more with a decreasing damping distance and is smallest close to the damping distance B=0. Such a course of the current IZ over the damping distance is generated by the control stage 46. This could, for example, contain a microprocessor which determines control values for the additional current source 44 from a stored family of characteristics according to the values of RLC and controls the additional current source 44 accordingly.

Figure 4:
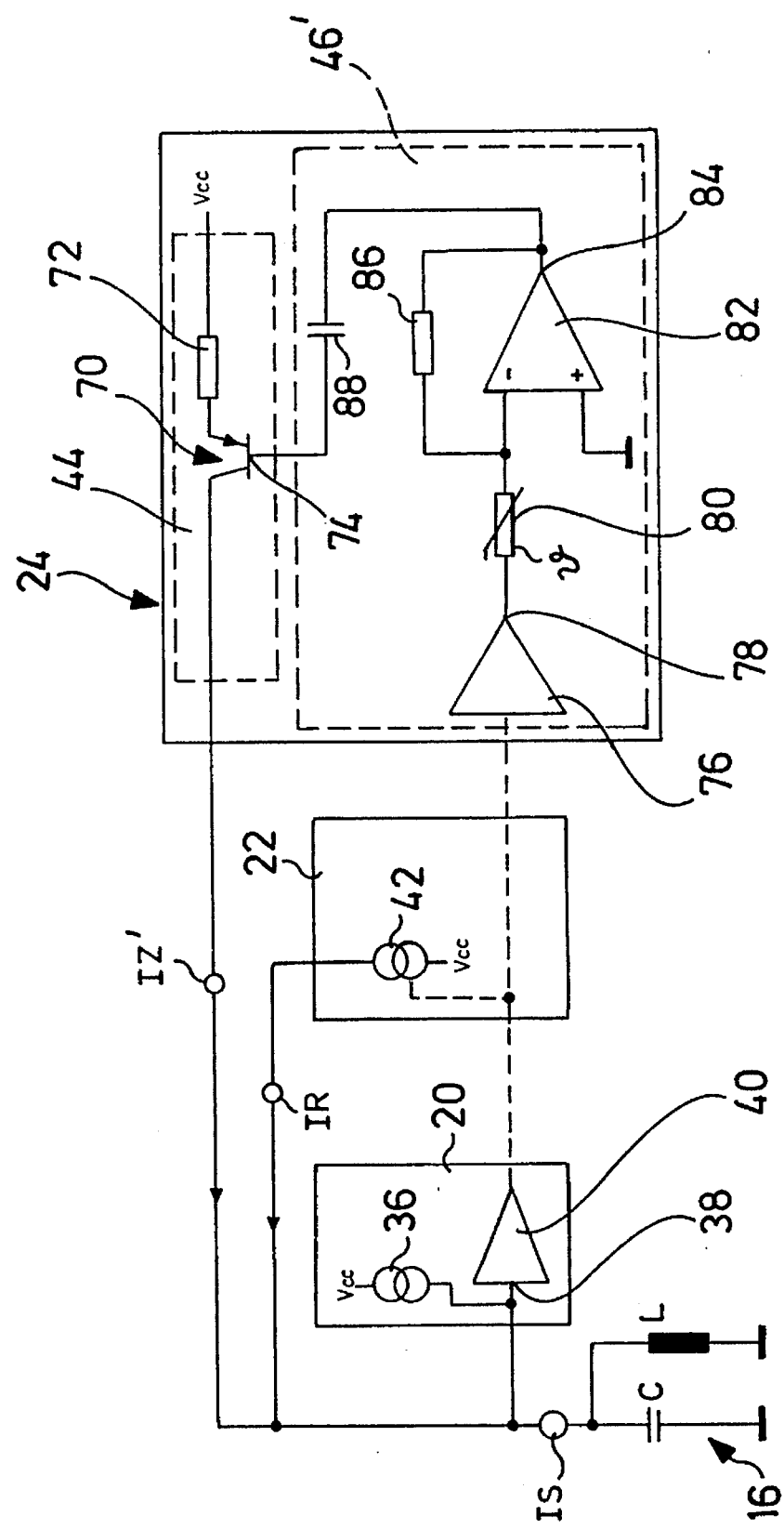
FIG. 4 is a first example for realizing an additional current stage.
Figure 5:
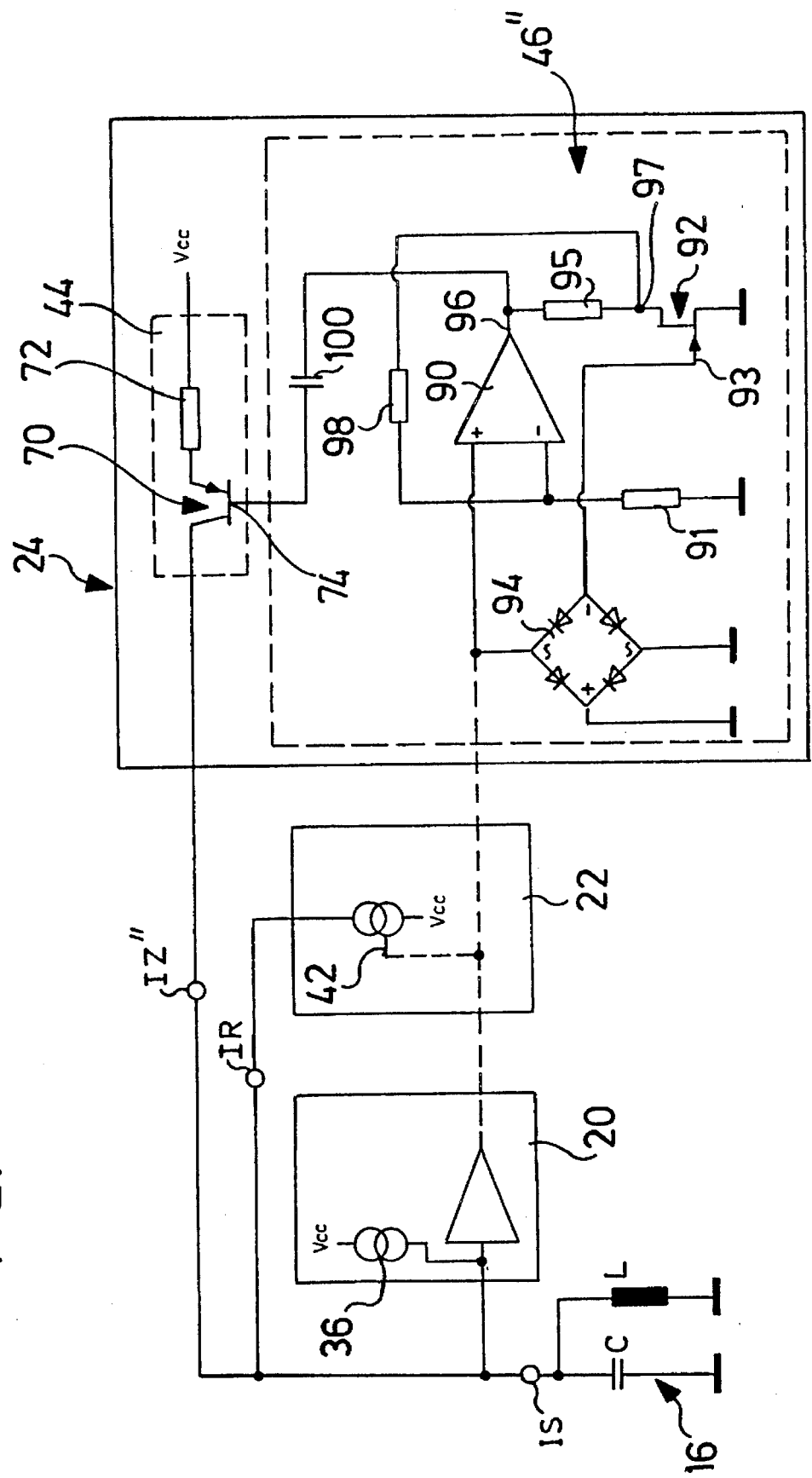
FIG. 5 is a second example for realizing an additional current stage.

Examples for realizing the additional current stage 24 are, for example, the circuits illustrated in FIG. 4 and FIG. 5.

In the additional current stage 24 illustrated in FIG. 4, the additional current source 44 is formed by a transistor 70 with a preconnected resistor 72, the base 74 of which is controlled via the control stage 46', whereby the control stage 46' has an amplifier 76 on the input side, the output 78 of the amplifier being connected via a thermistor 80 to a negative input of an operational amplifier 82 while a positive input of this operational amplifier 82 is connected to earth. An output 84 of the operational amplifier is coupled back to the negative input via a resistor 86 and, in addition, connected via a capacitor 88 to the base 74 of the transistor 70 and controls this.

The impedance characteristic of the thermistor 80 means that an appreciable control of the transistor 70 takes place only at small voltages ULC via the operational amplifier 82. When the voltages ULC increase, the control is less so that the feedback current IZ' displays approximately a 1/B course.

A similar course of a positive-feedback current IZ" is also obtained with the control stage 46" (FIG. 5) which likewise comprises an operational amplifier 90, the positive input of which is connected directly to an input of the control circuit 46" whereas its negative input is connected to earth via a resistor 91 and a gate 93 of the field effect transistor 92 is controlled via a connection of a rectifier 94. The field effect transistor 92 is located between an output 96 and earth with a preconnected resistor 95. The operational amplifier 90 is also coupled back to its negative input via a resistor 98, whereby the resistor 98 is connected between a drain connection 97 of the field effect transistor 92 and the resistor 95. In addition, the operational amplifier 90 controls the base 74 of the transistor 70 with its output 96 via a capacitor 100, in the same way as in the embodiment according to FIG. 4.

At small damping distances B, the control voltage applied to the gate 93, which is proportional to ULC, is small and a current through the field effect transistor 92 is high. This leads to a high amplification of the amplifier 90 and, therefore, to a high control signal for the transistor 70.

At large damping distances B, the current through the field effect transistor 92 is smaller due to the large control voltage at the gate 93 and, therefore, the amplification of the amplifier 90 is likewise smaller.

As for the rest, the additional current source 44 is designed in the same manner as in the embodiment according to FIG. 4.

Preferably, the control stages 46' and 46" according to FIG. 4 and FIG. 5, respectively, allow a course of the current IZ' or IZ" to be achieved which has the segment 58 and the section 60 so that in the range BK of small and the range BM of medium damping distances B, which correspond to the steeply rising region 50 and the rising region 52 of the impedance RLC, the ratios of ULC as illustrated in FIG. 2 are approximately achievable.

As for the rest, in the realization examples according to FIGS. 4 and 5 the other components of the oscillator 10 are designed in the same manner as in the embodiment according to FIG. 1 and so reference can be made in full to this.

Figure 6:
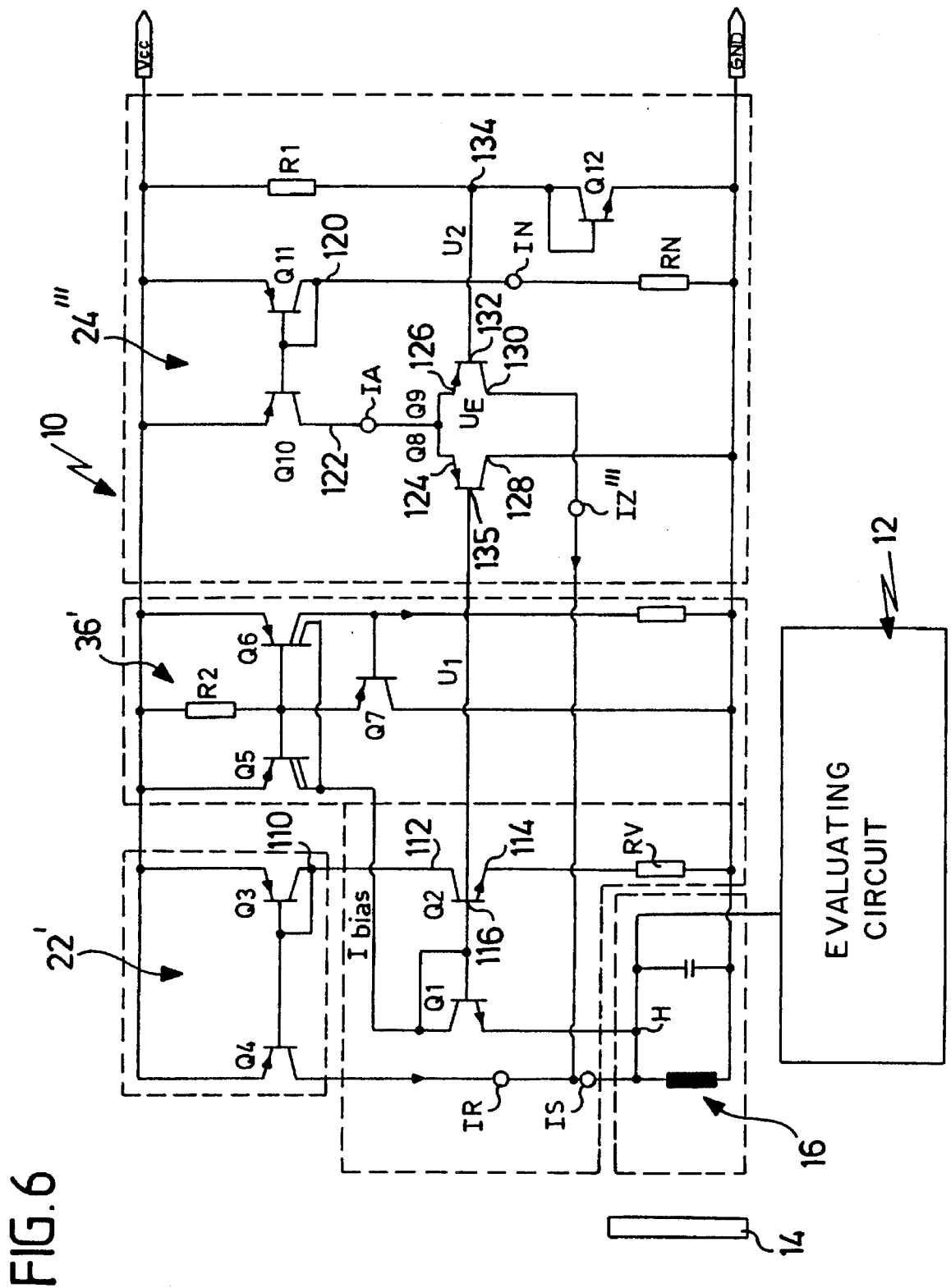
FIG. 6 is a second embodiment of an inventive sensor with a third form of realizing an inventive additional current stage.

A further, simplified embodiment of an inventive oscillator 10, illustrated in FIG. 6, comprises the known resonant circuit 16 which is kept oscillating by the loop current IS. In this respect, the loop current IS is composed of the feedback current IR and the additional current IZ'''.

The feedback stage 22', which comprises a customary current mirror formed by the transistors Q3 and Q4, supplies the feedback current IR.

Such conventional current mirrors are described, for example, in the book of Paul R. Gray, Robert G. Meyer: Analysis and Design of Analog Integrated Circuits, John Wiley & Sons, 2nd edition, 1984.

A control input 110 of the current mirror formed from the transistors Q3 and Q4 is located at the collector 112 of a transistor Q2, the emitter 114 of which is connected to earth via a resistor RV. A base 116 of this transistor Q2 is controlled via a transistor Q1 connected as diode, this transistor forming a diode located between the base 116 and the connection H for determining the operating range of the transistor Q2. A current Ibias which is supplied by a constant current source 36' flows via this diode formed by the transistor Q1.

The constant current source 36', which is formed for its part by the transistors Q5, Q6, Q7 and the resistor R2, represents a circuit known from the above-cited book of Paul R. Gray.

The additional current stage 24''' comprises a current mirror formed from the transistors Q10 and Q11, a resistor RN being located between its control input 120 and earth. A current IN flowing to earth from the control input 120 of the current mirror formed from the transistors Q10 and Q11 may be adjusted via this resistor RN and this current, for its part, determines an output current IA of the current mirror formed from the transistors Q10 and Q11, this output current flowing via the transistor Q10.

Emitters 124 and 126 of two transistors Q8 and Q9 are connected to an output 122 of the current mirror formed from the transistors Q10 and Q11. These transistors together form a difference amplifier, whereby a collector 128 of the transistor Q8 is connected to earth while a collector 130 of the transistor Q9 is connected to the connection H of the resonant circuit 16 and supplies this with additional current IZ'''.

In order to determine the operating mode of the difference amplifier formed from Q8 and Q9, a base 132 of the transistor Q9 is connected to a center tap 134 of a voltage divider; a resistor R1 is located between a supply voltage VCC and the center tap 134 and a transistor Q12 connected as diode between the center tap 134 and earth. In this way, the potential at the base 132 of the transistor Q9 is determined.

In contrast hereto, a base 135 of the transistor Q8 is connected to the base 116 of the transistor Q2 and therefore with the connection H of the resonant circuit 16 via the transistor Q1 connected as diode.

The additional current source 24''' operates in the manner illustrated in FIG. 7.

Figure 7A:
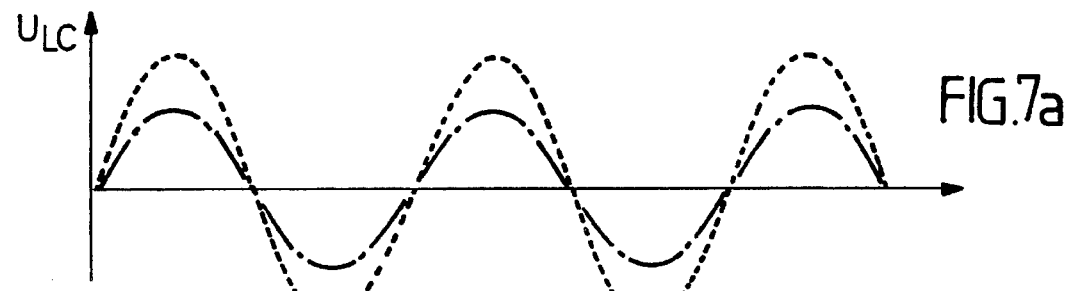
Figure 7B:
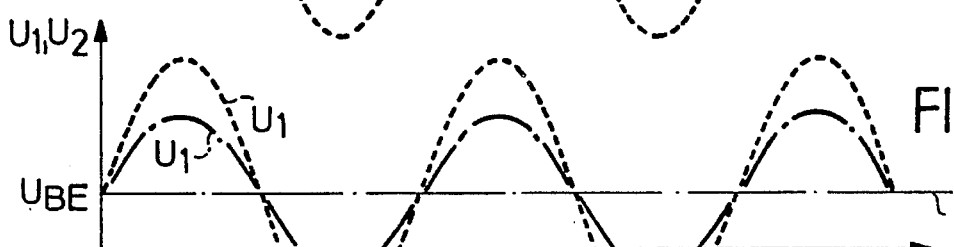

FIG. 7a shows the voltage course of the voltage ULC in the form of a dotted curve for the dedamped state of the resonant circuit 16 and in the form of a dash-dot curve for the damped state of the resonant circuit 16.

Due to the transistor Q1 connected as diode, a voltage ULC of this type leads to a voltage U1 at the base 134 of the transistor Q8 which is shifted about a base-emitter voltage UBE of the transistor Q1 so that the voltage U1 oscillates about the shift UBE depending on amplitude.

Figure 7C:
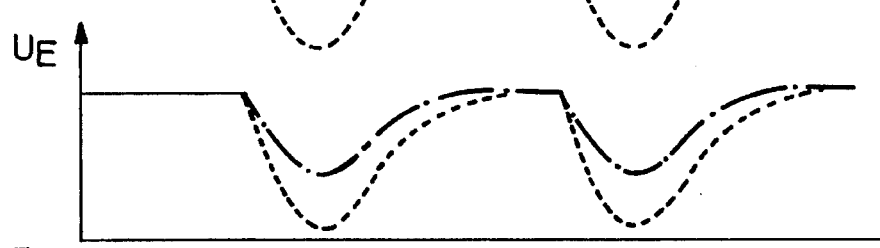

This voltage U1 is compared by the difference amplifier, formed from Q8 and Q9, with a voltage U2 which is applied to the base 132 of the transistor Q9 and therefore to the center tap 134 of the voltage divider formed from R1 and Q12, as well. This results in an emitter voltage UE which, as illustrated in FIG. 7c, has a maximum value when the transistor Q8 is blocked and the entire current flows through the transistor Q9. However, as soon as the transistor Q8 allows a current to flow, the voltage UE decreases, whereby the decrease is proportional to the amplitude of the voltage U1, i.e. the decrease is less in the damped state (dash-dot line) of the resonant circuit 16 than in the dedamped state (dotted line) of the resonant circuit 16.

Figure 7D:
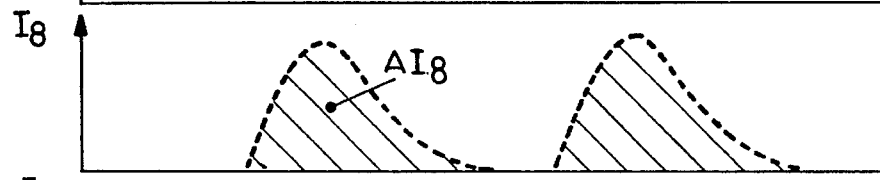
FIG. 7d shows the curve of the current I8 over the time.
Figure 7D:
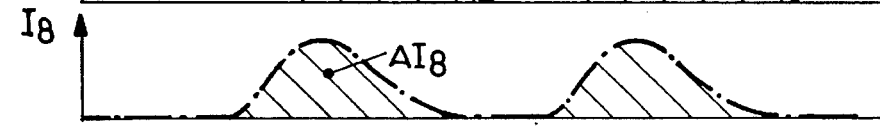

The currents flowing through the transistor Q8 are represented in FIG. 7d for the case of the damped resonant circuit (dash-dot line) and the case of the dedamped (dotted line) resonant circuit 16.

Figure 7E:
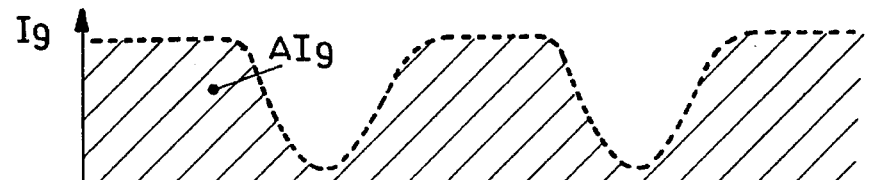
FIG. 7e shows the curve of the current I9 over the time.
Figure 7E:
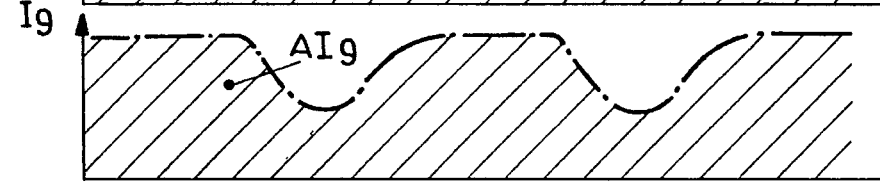

The currents flowing via the transistor Q9 in the two cases are illustrated in the same way in FIG. 7e.

The currents I9 flowing via the transistor Q9 form with their AC portions the current IZ''' which influences the oscillation state of the resonant circuit 16. The AC portion of the current I9 results from Fourier analysis of the current course of I9, whereby only the amplitude of the Fourier component corresponding to the resonant frequency of the resonant circuit 16 makes a contribution. The other components are filtered out by the resonant circuit 16 acting as filter. The amplitude of the Fourier component corresponding to the resonant frequency of the resonant circuit 16 is approximately proportional to the integral of the current I9 over the time and, therefore, to the shaded area AI9 illustrated in FIG. 7e. FIG. 7e shows that this area AI9 is larger in the case of damping and, therefore, a small amplitude of U1 than in the case of the dedamping, which again results in IZ''' being greater at small damping distances than at large distances and, therefore, a course of the amplitude value of IZ''' results which is similar to the course of IZ shown in FIG. 3.

Figure 8:
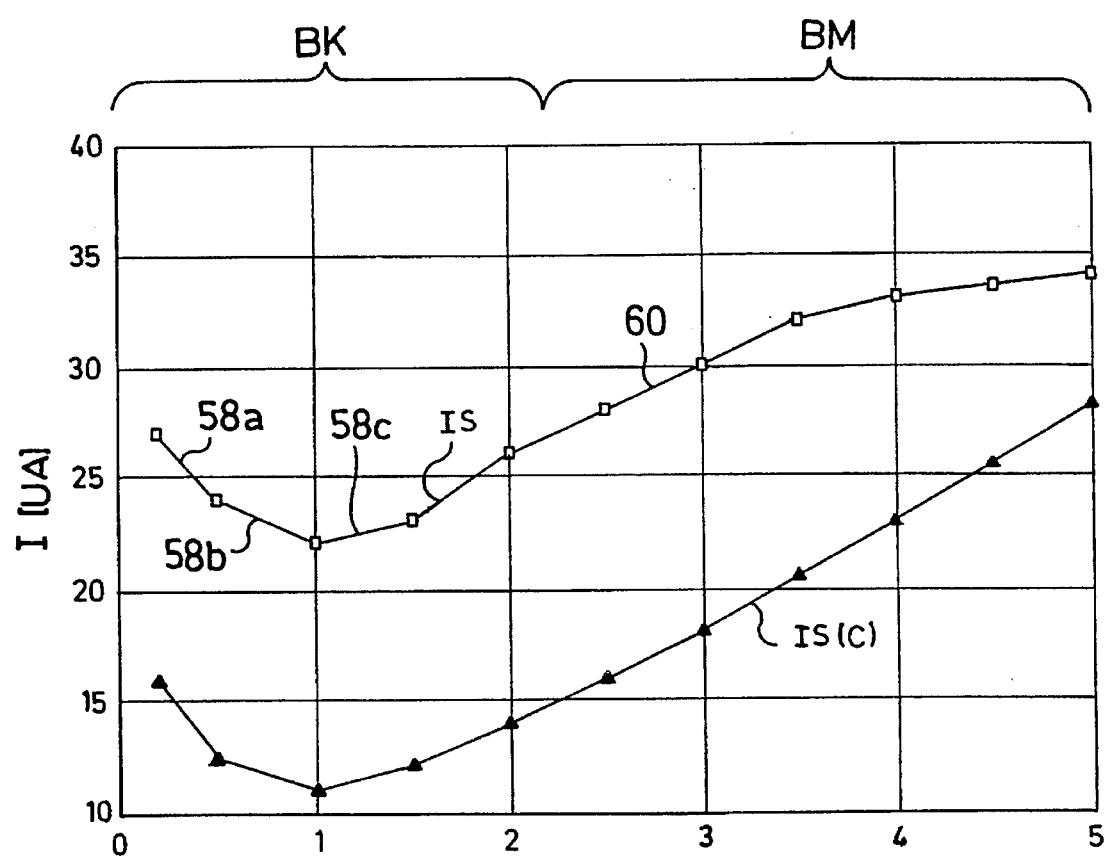
FIG. 8 is an illustration of a course of the amplitude value of the loop current IS over the damping distance for the embodiment according to FIG. 6 and an illustration of the course of the amplitude value of the loop current IS(C) calculated for the embodiment according to FIG. 6.

The course of the amplitude value of the loop current IS resulting from the currents IR and IZ''' is illustrated over the damping distance in FIG. 8 and exhibits in the range BK, for example, three segments 58a, b, c which merge into one another and the gradient of which is smaller than in the section 60 of the range BM.

Figure 9:
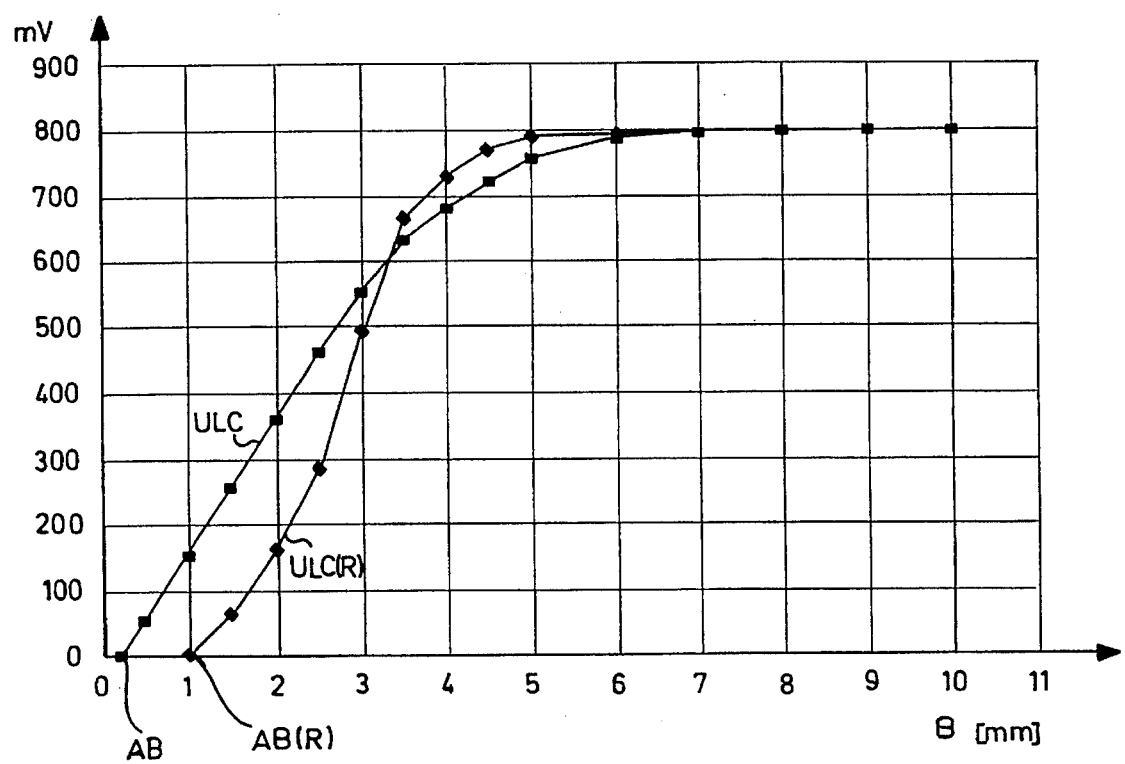
FIG. 9 is an illustration of the course of the amplitude value of the oscillator voltage ULC over the damping distance and an illustration of the course of the amplitude value of an oscillator voltage ULC (R), obtained without an inventive additional current stage.

This loop current IS leads to a course of the amplitude value of the voltage ULC illustrated in FIG. 9. It is apparent from FIG. 9 that ULC is linear, namely essentially from a value close to zero up to a damping distance in the range of approximately 4 to 5 mm, i.e. linear essentially in the ranges BK and BM. In addition, FIG. 9 illustrates the course of the amplitude value of ULC (R), i.e. of the oscillator voltage at IZ=0. This means that a distinct improvement in the linearity of the course of the amplitude value of ULC can be achieved due to the additional current IZ''' and, moreover, a shift of the breakdown point AB towards values close to zero.

Figure 10:
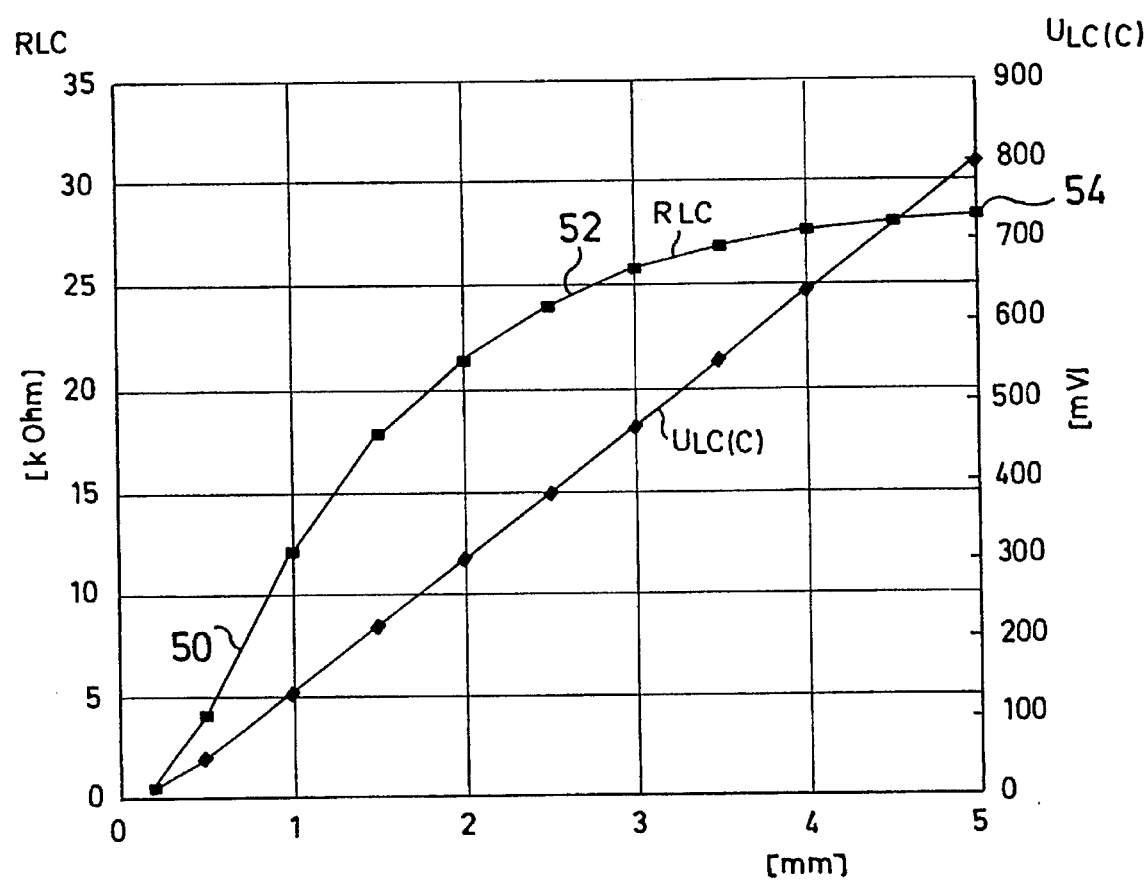
FIG. 10 is an illustration of the course of the resonant circuit impedance RLC of the embodiment according to FIG. 6 over the damping distance and an illustration of a calculated course of the amplitude value ULC (C) for the embodiment according to FIG. 6.

FIG. 10 illustrates, in addition, the course of the overall impedance RLC, whereby this has, in the same manner as already illustrated in FIG. 2, the regions 50, 52 and the region 54 which is no longer completely represented.

Furthermore, FIG. 10 illustrates an ideal linear course of ULC (C), i.e. a theoretical course of the amplitude values of the oscillator voltage. IS(C) is illustrated in addition in FIG. 8 for such a theoretical course.

The comparison of the theoretical values of ULC (C) and IS(C) with ULC and IS shows in the range BK and BM of small and medium damping distances a good correlation between the theoretical values calculated on the basis of RLC and the values of IS actually measured.

The present disclosure relates to the subject matter disclosed in German application No. P 43 17 359.4 of May 25, 1993, the entire specification of which is incorporated herein by reference.

What is claimed is:

1. A sensor having an oscillator and an evaluating circuit responsive to an output of said oscillator for evaluating said output to detect an electrically conductive or magnetizable object, wherein said oscillator comprises:

(i) a resonant circuit including an inductor and a capacitor providing an impedance dependent on a relative distance between said inductor and said object, said impedance varying within a first impedance range having a first general slope when said object is within a first range of distance relatively close to said inductor, said impedance varying within a second impedance range following said first impedance range when said object is within a second range of distance that is further away from said inductor than said first range of distance, said second impedance range having a second general slope that is less than said first slope, said impedance remaining substantially constant following said second impedance range when said object is within a third range of distance that is further away from said inductor than said second range of distance; and (ii) a closed adaptive loop stage having electrical components responsive to the value of said impedance for outputting to said resonant circuit a variable oscillating loop current having an amplitude dependent on said relative distance;

said closed adaptive loop stage controlling the amplitude of said loop current over said relative distance such that a plot of said amplitude with respect to said relative distance generates a continuous curve, a portion of said curve corresponding to said first range of distance having at least one segment with a gradient that is smaller than a gradient of the portion of the curve corresponding to said second range of distance.

2. A sensor in accordance with claim 1 wherein:

said continuous curve has a plurality of segments corresponding to said first range of distance; and the gradient of the portion of said curve corresponding to said second range of distance is greater than the gradient of each of said plurality of segments.

3. A sensor in accordance with claim 2 wherein each successive one of said plurality of segments corresponds to a greater distance between said object and inductor and has an increasingly larger gradient.

4. A sensor in accordance with claim 1 wherein said curve has a constant gradient over said first range of distance, 5. A sensor in accordance with claim 1 wherein the portion of said curve corresponding to said second range of distance rises essentially linearly over said second range of distance, 6. A sensor in accordance with claim 1 wherein the gradient of said curve has a maximum value immediately preceding the portion thereof corresponding to said second range of distance.

7. A sensor in accordance with claim 1 wherein the gradient of said curve has a minimum value at a point corresponding to a minimum distance of said object to said inductor.

8. A sensor in accordance with claim 2 wherein at least one of said plurality of segments has a gradient $\leq 0$.

9. A sensor in accordance with claim 1 wherein said closed adaptive loop provides said loop current at a value sufficient to maintain said oscillator in oscillation throughout said first range of distance, 10. A sensor in accordance with claim 1 wherein:

said oscillator is a voltage controlled oscillator responsive to a voltage derived from said-loop current; and said closed adaptive loop provides said loop current at values necessary to essentially continuously increase said voltage over said first and second ranges of distance, 11. A sensor in accordance with claim 10 wherein the essentially continuous increase of said voltage comprises a substantially linear increase, 12. A sensor in accordance with claim 1 wherein said impedance "R" is defined as $R=R_{res0}(1-e^{-B}/K)$, where $R_{res0}$ is the resonant circuit impedance when said object-is out of a sensing range of said inductor, B is said distance, K is a constant, and said first range of distance is limited to values orb smaller than about 2K.

13. A sensor in accordance with claim 1 wherein said impedance "R" is defined as $R={}^1R_{res0}(1-e^{-B}/K)$, where $R_{res0}$ is the resonant circuit impedance when said object is out of a sensing range of said inductor, B is said distance, K is a constant, and said second range of distance is limited to values of B between about 2K and about 4K.

14. A sensor in accordance with claim 1 wherein said closed adaptive loop stage comprises a first feedback stage having a first current source for providing a portion of said loop current to said resonant circuit and a second feedback stage having a second current source for providing an additional portion of said loop current to said resonant circuit.

15. A sensor in accordance with claim 14 wherein said additional portion of said loop current provided by said second feedback stage is greater over said first range of distance than over said second range of distance.

16. A sensor in accordance with claim 14 wherein said impedance "R" is defined as $R=R_{res0}(1-e^{-B/K})$, where $R_{res0}$ is the resonant circuit impedance when said object is out of a sensing range of said inductor, B is said distance, and K is a constant, said additional portion of said loop current provided by said second feedback stage being greater when the distance B<1.5K than when B>2K.

17. A sensor in accordance with claim 16 wherein at distances of less than B=3K, said additional portion of said loop current provided by said second feedback stage substantially increases the loop current over that provided by said first feedback stage alone.

18. A sensor in accordance with claim 14 wherein said second feedback stage provides a greater additional portion of said loop current at distances B below a critical distance than above said critical distance.

19. A sensor in accordance with claim 14 wherein said second feedback stage provides a progressively smaller additional portion of said loop current as the distance of the object from said inductor increases.

20. A sensor in accordance with claim 19 wherein the additional portion of said loop current provided by said second feedback stage decreases substantially in proportion to 1/B.

21. A sensor in accordance with claim 14 wherein said second feedback stage comprises a constant current source controlled by a controller in response to said loop current.

22. A sensor in accordance with claim 21 wherein said controller includes a difference amplifier.

23. A sensor in accordance with claim 21 wherein said controller is responsive to a control voltage derived from said loop current.

24. A sensor in accordance with claim 14 wherein said first feedback stage provides positive feedback in response to a control amplifier that receives said loop current.

25. A sensor in accordance with claim 24 wherein said first feedback stage comprises a current mirror.

26. A sensor in accordance with claim 1 wherein said closed adaptive loop comprises at least one controlled current source.

* * * * *